US 11,206,481 B2

(12) United States Patent
Ham et al.

(10) Patent No.: US 11,206,481 B2
(45) Date of Patent: Dec. 21, 2021

(54) DISPLAY APPARATUS

(71) Applicant: LG Display Co., Ltd., Seoul (KR)

(72) Inventors: Sungsu Ham, Yangsan-si (KR); YeongRak Choi, Paju-si (KR); Sungtae Lee, Incheon (KR); Daeho Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/791,093

(22) Filed: Feb. 14, 2020

(65) Prior Publication Data

US 2020/0186916 A1 Jun. 11, 2020

Related U.S. Application Data

(63) Continuation of application No. 16/051,802, filed on Aug. 1, 2018, now Pat. No. 10,595,121.

(30) Foreign Application Priority Data

Dec. 20, 2017 (KR) .................. 10-2017-0175978

(51) Int. Cl.
*H04R 1/28* (2006.01)
*H04R 1/02* (2006.01)
*G06F 3/147* (2006.01)
*H04R 7/04* (2006.01)

(52) U.S. Cl.
CPC ........... *H04R 1/2834* (2013.01); *H04R 1/025* (2013.01); *G06F 3/147* (2013.01); *G09G 2330/045* (2013.01); *G09G 2354/00* (2013.01); *H04R 7/045* (2013.01); *H04R 2440/05* (2013.01); *H04R 2499/15* (2013.01)

(58) Field of Classification Search
CPC .... H04R 2499/15; H04R 1/025; H04R 7/045; H04R 1/2834; H04R 2440/05; G06F 3/147; G09G 2330/045; G09G 2354/00
USPC ........................................................ 381/333
See application file for complete search history.

(56) References Cited

U.S. PATENT DOCUMENTS

| 9,565,489 | B2 | 2/2017 | Lee et al. |
| 2006/0078138 | A1 | 4/2006 | Wada |
| 2009/0097692 | A1* | 4/2009 | Sakamoto ............ H04R 7/045 381/388 |
| 2014/0334078 | A1 | 11/2014 | Lee et al. |

(Continued)

FOREIGN PATENT DOCUMENTS

| CN | 104751743 A | 7/2015 |
| CN | 105050018 A | 11/2015 |

(Continued)

OTHER PUBLICATIONS

Office Action dated Apr. 30, 2021, issued in corresponding Chinese Patent Application No. 201810915049.8.

*Primary Examiner* — Paul Kim
(74) *Attorney, Agent, or Firm* — Morgan, Lewis & Bockius LLP

(57) ABSTRACT

A display apparatus includes a display panel displaying an image, a rear cover supporting the display panel, and a vibration generating device vibrating the display panel. The vibration generating device includes a sound generating module spaced apart from a rear surface of the display panel. Accordingly, shaking of the display panel is prevented, and heat is prevented from being transferred to the display panel.

25 Claims, 11 Drawing Sheets

(56) References Cited

U.S. PATENT DOCUMENTS

| | | |
|---|---|---|
| 2015/0138157 A1 | 5/2015 | Harris et al. |
| 2015/0185963 A1 | 7/2015 | Lee et al. |
| 2015/0341714 A1 | 11/2015 | Ahn et al. |
| 2016/0050472 A1 | 2/2016 | Lee et al. |
| 2017/0280234 A1 | 2/2017 | Choi et al. |

FOREIGN PATENT DOCUMENTS

| | | |
|---|---|---|
| CN | 105491474 A | 4/2016 |
| KR | 100731395 A | 5/2006 |
| KR | 101704517 B1 | 2/2017 |

* cited by examiner

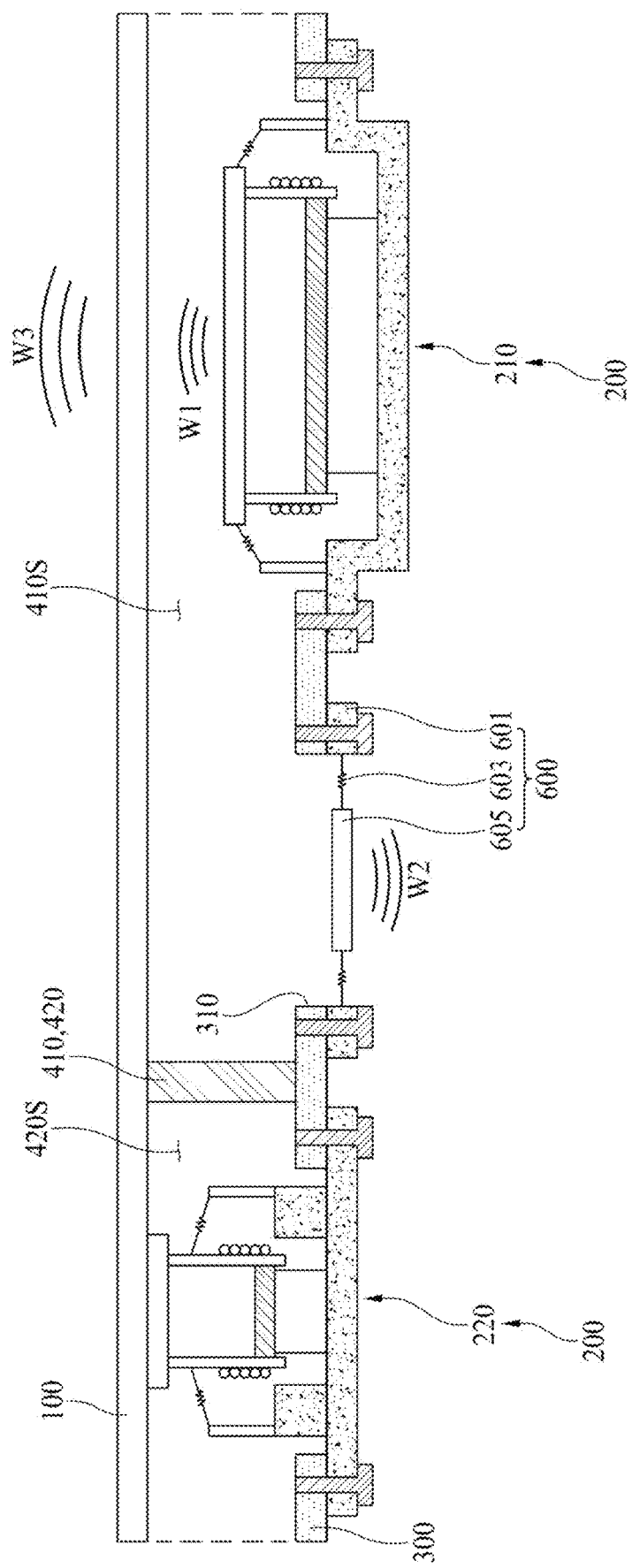

DISPLAY APPARATUS

CROSS-REFERENCE TO RELATED APPLICATIONS

This application is a continuation of U.S. patent application Ser. No. 16/051,802, filed on Aug. 1, 2018, which claims the benefit of the Korean Patent Application No. 10-2017-0175978, filed on Dec. 20, 2017, both of which are hereby incorporated by reference as if fully set forth herein.

BACKGROUND

Technical Field

The present disclosure relates to a display apparatus.

Discussion of the Related Art

Recently, as society advances to the information-oriented society, the field of display apparatuses for visually displaying an electrical information signal has rapidly advanced. Consequently, various display apparatuses having excellent performances such as thinness, lightness, and low power consumption are being developed. Examples of the display apparatuses may include liquid crystal display (LCD) apparatuses, field emission display (FED) apparatuses, organic light emitting display apparatuses, etc.

Generally, display apparatuses display an image on a display panel, but a separate speaker should be installed for providing a sound. In a case where a speaker is installed in a display apparatus, a traveling direction of a sound output through the speaker is a direction toward a side end or an upper/lower end of the display panel, instead of a front surface or a rear surface of the display panel, and thus, the sound does not travel in a direction toward a viewer who is watching an image in front of the display panel, whereby an immersiveness of the viewer watching the image is hindered.

Moreover, in a case where a speaker included in a set device such as televisions (TVs) is provided, the speaker occupies a certain space, and due to this, the design and space disposition of the set device are limited. In order to solve such a problem, a related art display apparatus may vibrate a display panel to output a sound to a region in front of the display panel, but has a problem where it is difficult to output a sound having a low frequency band. For example, if a sound having the low frequency band is output by vibrating the display panel, the display panel is severely shaken, causing a problem where an image is shaken. Also, a vibration generating device for generating a sound having the low frequency band is high in amount of occurring heat, and for this reason, adversely affects a lifetime of the display panel. In order to prevent such a problem, it is required to develop a display apparatus which prevents a display panel from being shaken and prevents the transfer of heat, in a process of outputting a sound having the low frequency band.

SUMMARY

Accordingly, embodiments of the present disclosure are directed to a display apparatus that substantially obviates one or more problems due to limitations and disadvantages of the related art.

An aspect of the present disclosure is to provide a display apparatus which includes a sound generating module spaced apart from a rear surface of a display panel, and thus, prevents shaking of the display panel and prevents heat from being transferred to the display panel.

Another aspect of the present disclosure is to provide a display apparatus which includes a sound generating module for outputting a sound having a low frequency band and an amplification member for amplifying a vibration generated by the sound generating module, and thus, expands a reproducible low sound band and easily controls an output of a sound having the low frequency band.

Another aspect of the present disclosure is to provide a display apparatus which includes a sound generating module for outputting a sound having a low frequency band and a vibration transmission member for transferring a vibration generated by the sound generating module to a region behind the display apparatus, and thus, expands a reproducible low sound band and easily controls an output of a sound having the low frequency band.

Another aspect of the present disclosure is to provide a display apparatus in which a speaker is not separately disposed in a space other than a region of a display panel, and thus, a sense of design beauty is enhanced, thereby improving the image quality and sound quality of the display apparatus to enhance an immersiveness of a viewer.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and in accordance with the purpose of the disclosure, as embodied and broadly described herein, a display apparatus comprises a display panel displaying an image, a rear cover supporting the display panel, and a vibration generating device vibrating the display panel, wherein the vibration generating device includes a sound generating module spaced apart from a rear surface of the display panel.

In another aspect, a display apparatus comprises a display panel displaying an image, a rear cover supporting the display panel, and a vibration generating device vibrating the display panel, wherein the vibration generating device includes a first sound generating module spaced apart from a rear surface of the display panel and a second sound generating module attached on the rear surface of the display panel.

Details of other embodiments are included in the detailed description and the drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings:

FIG. 11 is a cross-sectional view taken along line of FIG. 10.

DETAILED DESCRIPTION

Figure 1:
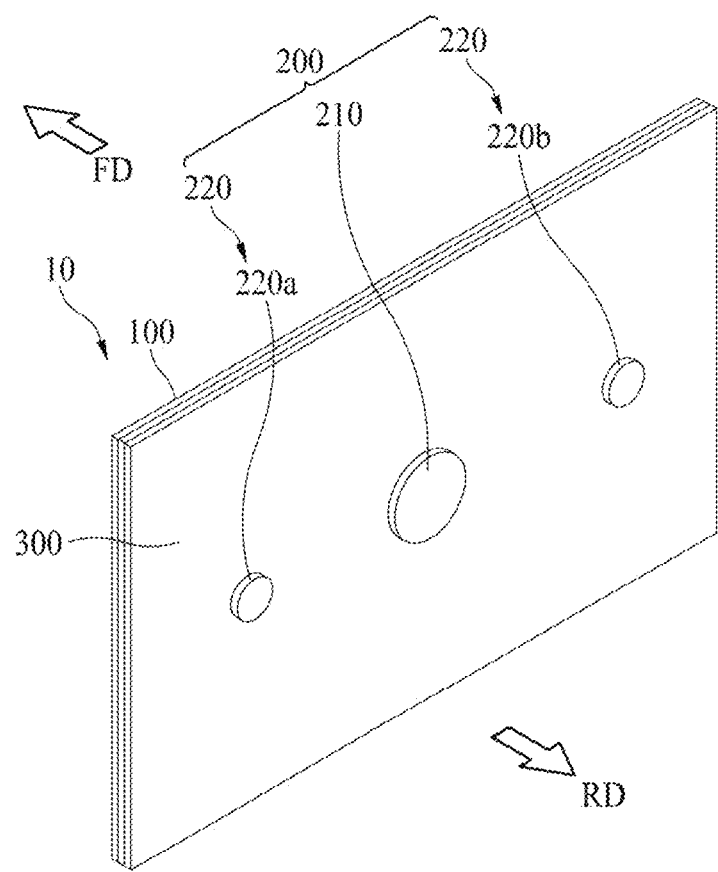
FIG. 1 is a perspective view of a display apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first", "second", etc. may be used. The terms are merely for differentiating one element from another element, and the essence, sequence, order, or number of a corresponding element should not be limited by the terms. It will be understood that when an element or layer is described as being "connected", "coupled", or "adhered" to another element or layer, the element or layer can be directly connected or adhered to the other element or layer, but the other element or layer can be "disposed" between elements or layers, or elements or layers can be "connected", "coupled", or "adhered" to each other through the other element or layer.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

Depending on the case, an LCM or an OLED module including a display panel and a driver may be referred to as a narrow-sense display apparatus, and an electronic device which is a final product including an LCM or an OLED module may be referred to as a set device. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to the present embodiment may use all types of display panels such as a liquid crystal display panel, an organic light emitting diode (OLED) display panel, and an electroluminescent display panel, but is not limited to a specific display panel which is vibrated by a sound generating device according to the present embodiment to output a sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like).

Moreover, the display panel may further include a backing such as a metal plate attached on the display panel. However, the present embodiment is not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
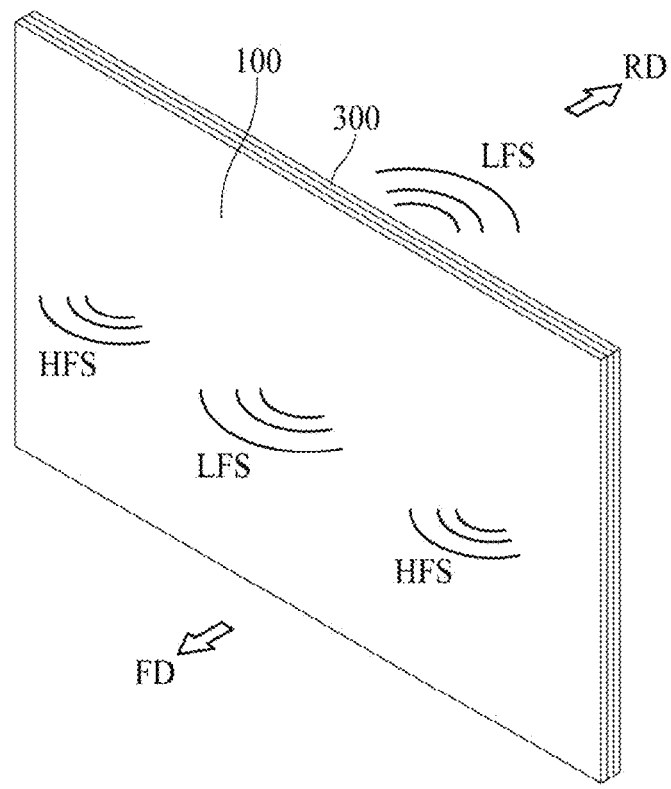
FIG. 2 is a diagram illustrating a sound output of a display apparatus according to an embodiment of the present disclosure.
Figure 3:
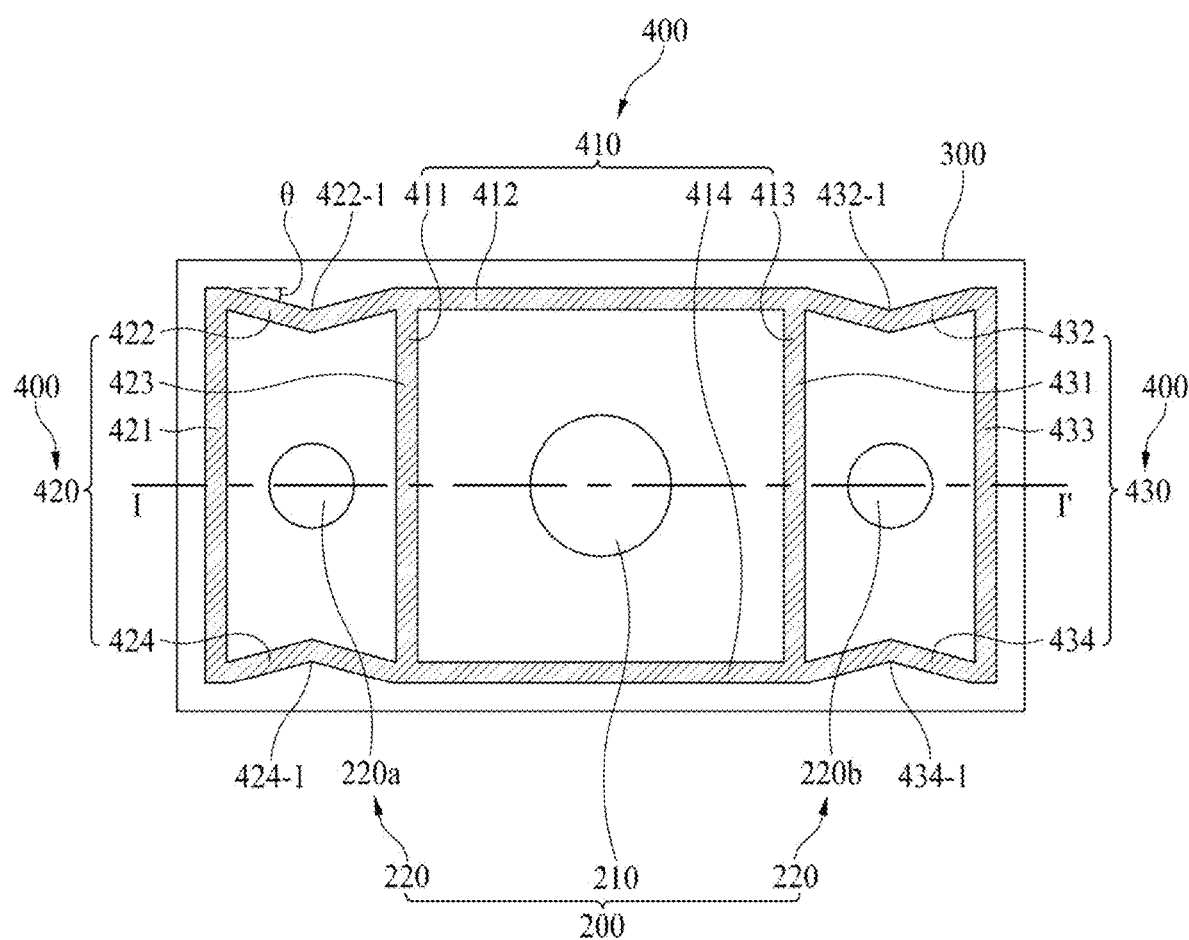
FIG. 3 is a rear view of a display apparatus according to a first embodiment of the present disclosure.
Figure 4:
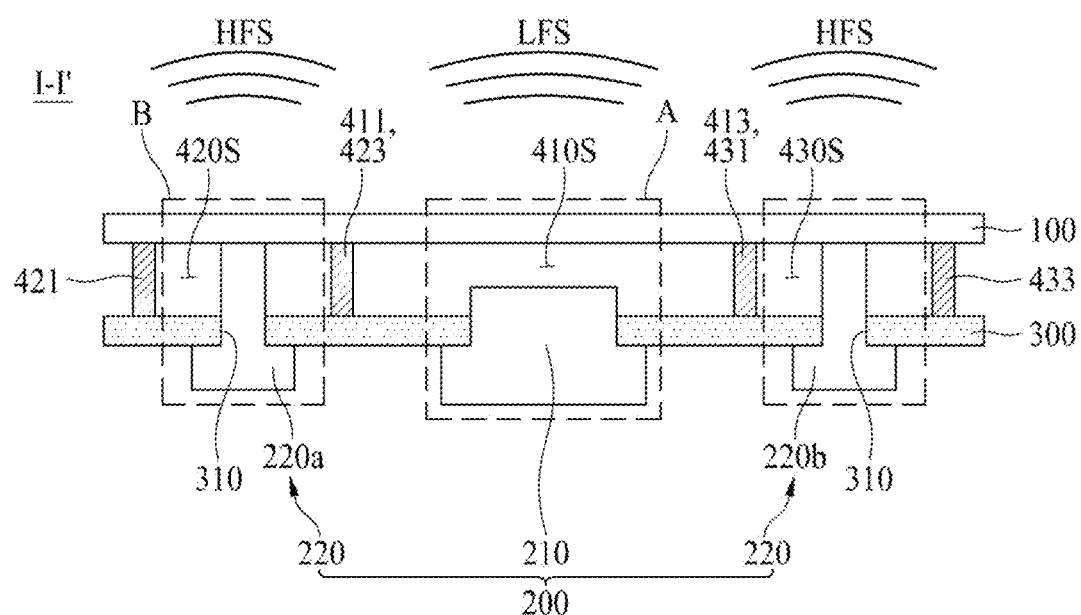
FIG. 4 is a cross-sectional view taken along line I-I' of FIG. 3.

FIG. 1 is a perspective view of a display apparatus according to an embodiment of the present disclosure, and FIG. 2 is a diagram illustrating a sound output of a display apparatus according to an embodiment of the present disclosure. FIG. 3 is a rear view of a display apparatus according to a first embodiment of the present disclosure, and FIG. 4 is a cross-sectional view taken along line I-I' of FIG. 3.

Referring to FIGS. 1 to 4, a display apparatus 10 may include a display panel 100, a vibration generating device 200, a rear cover 300, and a partition member 400.

The display panel 100 may display an image and may be implemented as all types of display panels such as a liquid crystal display panel, an organic light emitting diode (OLED) display panel, an electroluminescent display panel, etc. The display panel 100 may vibrate according to a vibration of the vibration generating device 200 to output a sound.

According to an embodiment, the display panel 100 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed, and in the bottom emission type, the visible light emitted from the pixel array layer may be irradiated onto a region behind the base substrate to allow an image to be displayed.

The vibration generating device 200 may be disposed on a rear surface of the display panel 100 and may vibrate the display panel 100. In detail, the vibration generating device 200 may be fixed to the rear cover 300 and may vibrate the display panel 100 to output a sound to a forward region FD in front of the display panel 100. For example, the vibration generating device 200 may generate a sound by using the display panel 100 as a vibration plate.

The vibration generating device 200 may pass through the rear cover 300 and may contact the rear surface of the display panel 100, thereby directly vibrating the display panel 100. According to an embodiment, an upper portion of the vibration generating device 200 may be inserted into a through hole 310 provided in the rear cover 300 and may be connected to the rear surface of the display panel 100, and a lower portion of the vibration generating device 200 may contact and may be fixed to a rear surface of the rear cover 300. Therefore, the vibration generating device 200 may vibrate according to a vibration signal corresponding to a sound signal associated with an image by using the rear cover 300 as a supporter to vibrate the display panel 100, thereby outputting a sound to the forward region FD in front of the display panel 100. Therefore, by using the display panel 100 as a vibration plate of a sound device, the display apparatus 10 may output a sound to the forward region FD instead of a rearward region RD behind the display panel 100 and a region under the display panel 100, and thus, may allow an output position of an image displayed by the display apparatus 10 to match an output position of a sound generated by the display apparatus 10, thereby enhancing an immersiveness of a viewer who is watching the image displayed by the display apparatus 10.

The vibration generating device 200 may include first and second sound generating modules 210 and 220 which vibrate different regions of the display panel 100. For example, the display panel 100 may include a middle region and a peripheral region, the first sound generating module 210 may overlap the middle region of the display panel 100, and the second sound generating module 220 may overlap the peripheral region of the display panel 100. According to an embodiment, the second sound generating module 220 may include a plurality of second sound generating modules 220a and 220b, and the plurality of second sound generating modules 220a and 220b may be respectively disposed in a left region and a right region of the display panel 100. Therefore, the plurality of second sound generating modules 220a and 220b may be disposed symmetrically with respect to the first sound generating module 210. In this manner, the first sound generating module 210 may be disposed in a center of the rear surface of the display panel 100 to vibrate the middle region of the display panel 100, and the plurality of second sound generating modules 220a and 220b may be respectively disposed on a left side and a right side of the rear surface of the display panel 100 to respectively vibrate the left region and the right region of the display panel 100. Also, the first and second sound generating modules 210 and 220 may receive different vibration signals and may be independently driven. For example, the first sound generating module 210 may generate a sound by using the middle region of the display panel 100 as a vibration plate, and the plurality of second sound generating modules 220a and 220b may generate sounds by respectively using the left region and the right region of the display panel 100 as vibration plates. Also, the plurality of second sound generating modules 220a and 220b may respectively vibrate the left region and the right region of the display panel 100 to output a stereo sound and may allow a 2.0 channel sound to be output to the forward region FD in front of the display panel 100.

The first sound generating module 210 may be spaced apart from the rear surface of the display panel 100 and may be fixed to the rear cover 300, and the second sound generating module 220 may be attached on the rear surface of the display panel 100. According to an embodiment, the first sound generating module 210 may generate a sound LFS having a low sound band, and the second sound generating module 220 may generate a sound HFS having a high sound band. For example, the first sound generating module 210 may transfer a vibration having a low frequency domain to the middle region of the display panel 100, and the display panel 100 may receive the vibration having the low frequency domain of the first sound generating module 210 to indirectly output the sound LFS having the low sound band to the forward region FD. Here, the low frequency domain may denote a frequency domain of 400 Hz or less, a middle frequency domain may denote a frequency domain of 400 Hz to 20 kHz, and a high frequency domain may denote a frequency domain of 20 kHz or more. Such classification is necessary for description, and the present embodiment is not limited thereto. Also, the sound LFS having the low sound band may denote a sound generated based on a vibration having the low frequency domain of 400 Hz or less, and the sound HFS having a middle-high sound band may denote a sound generated based on a vibration having a middle-high frequency domain of 400 Hz or more. Such classification is necessary for description, and the present embodiment is not limited thereto. Also, the first sound generating module 210 may correspond to a woofer, but is not limited to the term. Also, the second sound generating module 220 may transfer a vibration having the middle-high frequency domain to the peripheral region of the display panel 100, and the display panel 100 may receive the vibration having the middle-high frequency domain of the second sound generating module 220 to output the sound HFS having the high sound band to the forward region FD.

According to an embodiment, the second sound generating module 220 may be disposed more adjacent to an edge of the display panel 100 than the first sound generating module 210. In detail, the vibration having the low frequency domain generated by the first sound generating module 210 may be rectilinearly transferred through a first air gap 410S and the display panel 100, and the sound LFS having the low frequency domain may be output to the forward region FD in front of the display panel 100. Also, the vibration having the middle-high frequency domain generated by the second sound generating module 220 may be directly transferred to the display panel 100, and the sound HFS having the middle-high frequency domain may be output to the forward region FD in front of the display panel 100. Here, the vibration having the middle-high frequency domain may be transferred to the edge of the display panel 100, and a vibration of the edge of the display panel 100 may have a close relationship with a sound output characteristic corresponding to the middle-high frequency domain. For example, if attenuation of a vibration occurs in a process of transferring the vibration having the middle-high frequency domain to the edge of the display panel 100, a sound pressure level corresponding to the middle-high frequency domain is reduced. Accordingly, if the second sound generating module 220 is spaced apart from the edge of the display panel 100 by a long distance, a vibration transfer path corresponding to the middle-high frequency domain may extend, and thus, a sound pressure level corresponding to the middle-high frequency domain is reduced. In this manner, the second sound generating module 220 may be disposed in a region adjacent to the edge of the display panel 100 and may minimize a length of the vibration transfer path corresponding to the middle-high frequency domain to prevent a sound pressure level corresponding to the middle-high frequency domain from being reduced. As a result, if the second sound generating module 220 is disposed in a region adjacent to the edge of the display panel 100, the display apparatus 10 may output the sound HFS having the high sound band, which has a sound pressure level higher than a case where the second sound generating module 220 is spaced apart from the edge of the display panel 100 by a long distance.

According to an embodiment, the vibration generating device 200 may be a speaker and may be an actuator or an exciter, but is not limited thereto. In other embodiments, the vibration generating device 200 may be a sound device which outputs a sound according to an electrical signal.

The rear cover 300 may be disposed on the rear surface of the display panel 100 to support the display panel 100. For example, the rear cover 300 may be spaced apart from the display panel 100 to support the vibration generating device 200 disposed in the rear cover 300.

The rear cover 300 may cover the whole rear surface of the display panel 100 in a state of being spaced apart therefrom and may have a plate shape formed of a glass material, a metal material, or a plastic material. Here, an edge or a sharp corner of the rear cover 300 may have a tetragonal shape or a curved shape through a chamfer process or a corner rounding process. According to an embodiment, the rear cover 300 including the glass material may include sapphire glass. For example, the rear cover 300 including the metal material may be formed of one of aluminum (Al), an Al alloy, a magnesium (Mg) alloy, and an iron (Fe)-nickel (Ni) alloy. As another example, the rear cover 300 may have a stacked structure including a glass plate, which has a thickness relatively thinner than a metal plate and a glass plate and faces the rear surface of the display panel 100, and in this case, a rear surface of the display apparatus 10 may be used as a mirror surface due to the metal plate.

The rear cover 300 may include the through hole 310 into which the vibration generating device 200 is inserted. In detail, the through hole 310 may be bored in a partial region of the rear cover 300 along a thickness direction of the rear cover 200 to have a circular shape or a polygonal shape, in order for the vibration generating device 200 to be inserted thereinto. Therefore, the vibration generating device 200 may be disposed on the rear surface of the display panel 100 to pass through the through hole 310.

The partition member 400 may be disposed between the display panel 100 and the rear cover 300. According to an embodiment, the partition member 400 may surround the first sound generating module 210 and the plurality of second sound generating modules 220a and 220b. Also, the partition member 400 may partition a region where the first sound generating module 210 is disposed and regions where the plurality of second sound generating modules 220a and 220b are respectively disposed. Here, the first sound generating module 210 may vibrate the middle region of the display panel 100, and the plurality of second sound generating modules 220a and 220b may respectively vibrate the left region and the right region of the display panel 100. Therefore, the partition member 400 prevents interference between sounds generated by the center region, the left region, and the right region of the display panel 100.

According to an embodiment, the partition member 400 may correspond to an enclosure or a baffle, but is not limited to the term. For example, the partition member 400 may be formed of polyurethane, polyolefin, and/or the like, but is not limited thereto. Also, the partition member 400 may be implemented with a single-sided tape or a double-sided tape and may be formed of a material having an elastic force which enables compression to be made to a certain degree.

The partition member 400 may separate sounds generated by the first sound generating module 210 and the plurality of second sound generating modules 220*a* and 220*b*. The partition member 400 may attenuate or absorb a vibration of the display panel 100, thereby preventing a sound generated by one of the middle region, the left region, and the right region of the display panel 100 from being transferred to another region. Therefore, the partition member 400 may separate the sounds to enhance a sound output characteristic. According to an embodiment, the partition member 400 may separate the sounds generated by the first sound generating module 210 and the plurality of second sound generating modules 220*a* and 220*b*, and thus, may allow a 2.0 channel sound to be output from the display panel 100 according to the vibration of the display panel 100.

According to an embodiment, the partition member 400 may include first to third partition members 410 to 430. In detail, the display panel 100 may include the middle region, the left region, the right region, and the first partition member 410 may surround the middle region of the display panel 100, the second partition member 420 may surround the left region of the display panel 100, and the third partition member 430 may surround the right region of the display panel 100. For example, the first to third partition members 410 to 430 may be respectively disposed along an edge of the middle region, an edge of the left region, and an edge of the right region of the display panel 100, and the first partition member 410 may be disposed between the second and third partition members 420 and 430. Each of the first to third partition members 410 to 430 prevents a sound from being leaked through a corresponding side surface of side surfaces of the display panel 100, and thus, allows the sound to be output to a region in front of the display panel 100, thereby enhancing the sound output characteristic.

The partition member 400 may be disposed between the display panel 100 and the rear cover 300 and may provide an air gap between the rear surface of the display panel 100 and the front surface of the rear cover 300. In detail, the partition member 400 may surround an air gap provided between the vibration generating device 200 and the display panel 100. Here, the air gap may be used as a space where the vibration generating device 200 inserted into the through hole 310 is disposed and a space for a vibration of the display panel 100 based on driving of the vibration generating device 200.

For example, the first partition member 410 may surround a first air gap 410S provided between the first sound generating module 210 and the middle region of the display panel 100, the second partition member 420 may surround a second air gap 420S provided between the second sound generating module 220*a* and the left region of the display panel 100, and the third partition member 430 may surround a third air gap 430S provided between the second sound generating module 220*b* and the right region of the display panel 100. That is, the first to the third air gaps 410S to 430S may respectively overlap the first sound generating module 210 and the plurality of second sound generating modules 220*a* and 220*b*. Also, the first to third partition members 410 to 430 may respectively surround the first to the third air gaps 410S to 430S respectively overlapping the first sound generating module 210 and the plurality of second sound generating modules 220*a* and 220*b*, and thus, may separate sounds generated by the first sound generating module 210 and the plurality of second sound generating modules 220*a* and 220*b*.

The first to third partition members 410 to 440 may each include four sides. For example, the first partition member 410 may include first to fourth sides 411 to 414, the second partition member 420 may include first to fourth sides 421 to 424, and the third partition member 430 may include first to fourth sides 431 to 434. According to an embodiment, the first side 411 of the first partition member 410 and the third side 423 of the second partition member 420 may share the same partition member and may be implemented as different partition members. Likewise, the third side 413 of the first partition member 410 and the first side 431 of the third partition member 430 may share the same partition member and may be implemented as different partition members. Here, the first to fourth sides 421 to 424 of the second partition member 420 and the first to fourth sides 431 to 434 of the third partition member 430 have a difference in that the first to fourth sides 421 to 424 of the second partition member 420 or the first to fourth sides 431 to 434 of the third partition member 430 are disposed in the left region or the right region of the display panel 100, and thus, a description of the same technical feature of each of the first to fourth sides 421 to 424 of the second partition member 420 as that of each of the first to fourth sides 421 to 424 of the second partition member 420 is omitted.

According to an embodiment, the partition member 400 may include a bent part which is provided in at least one of the four sides. For example, the second side 422 and the fourth side 424 of the second partition member 420 may respectively include a bent part 422-1 and a bent part 424-1. Therefore, two sides (for example, an upper side 422 and a lower side 424) of four sides surrounding the left region of the display panel 100 may each include a bent part which is provided to have a certain inclined angle "θ" with respect to a horizontal direction (or a widthwise direction) of the display panel 100. The bent part 422-1 may be configured with two rectilinear parts and may be provided at a position at which the two rectilinear parts contacts each other. Also, the bent part 422-1 may be configured in a rectilinear shape, a curve shape, or a round shape, but is not limited thereto.

According to an embodiment, an inclined angle "θ" of the bent part 422-1 may vary based on a degree to which restriction of a standing wave is desired, and may be variably adjusted to 10 degrees to 30 degrees. For example, if a sound output region is for the low sound band or an output of a sound generating device is large, the inclined angle "θ" of the bent part 422-1 may be adjusted to a large angle. Alternatively, if the sound output region is for the high sound band or the output of the sound generating device is small, the inclined angle "θ" of the bent part 422-1 may be adjusted to a small angle.

According to an embodiment, the bent part 422-1 prevents a sound pressure from being reduced between the display panel 100 and the rear cover 300. For example, a sound wave which is generated when the display panel 100 is vibrated by the vibration generating device 200 may be spread radially from a center of the vibration generating device 200 and may travel. The sound wave may be referred to as a progressive wave. The progressive wave may be reflected by one side of the partition member 400 to generate a reflected wave, and the reflected wave may travel in a direction opposite to the progressive wave. The reflected wave overlaps and interferes in the progressive wave and does not travel, thereby generating a standing wave which stands at a certain position. A sound pressure is reduced by the standing wave, and for this reason, a sound output characteristic is reduced. Therefore, a bent part may be provided in the partition member 400 in order to decrease the degree of reduction in sound pressure caused by the standing wave generated by interference between the reflected wave and the progressive wave. Also, the standing wave which causes the sound pressure to be reduced is much generated at a position at which a level of each of the progressive wave and the reflected wave is high. Accordingly, the bent part 422-1 may be disposed at a position at which a level of a sound wave transferred from a vibration generating module is highest. According to an embodiment, the bent part 422-1 may be bent toward the vibration generating device 200.

According to an embodiment, each of the first to third partition members 410 to 430 may be implemented with a double-sided tape or a single-sided tape, which includes polyurethane or polyolefin and has a certain thickness (or height) and a certain width, but is not limited thereto. Also, each of the first to third partition members 410 to 430 may have an elastic force which enables compression to be made to a certain degree, and may be referred to as an enclosure or a baffle.

Figure 5:
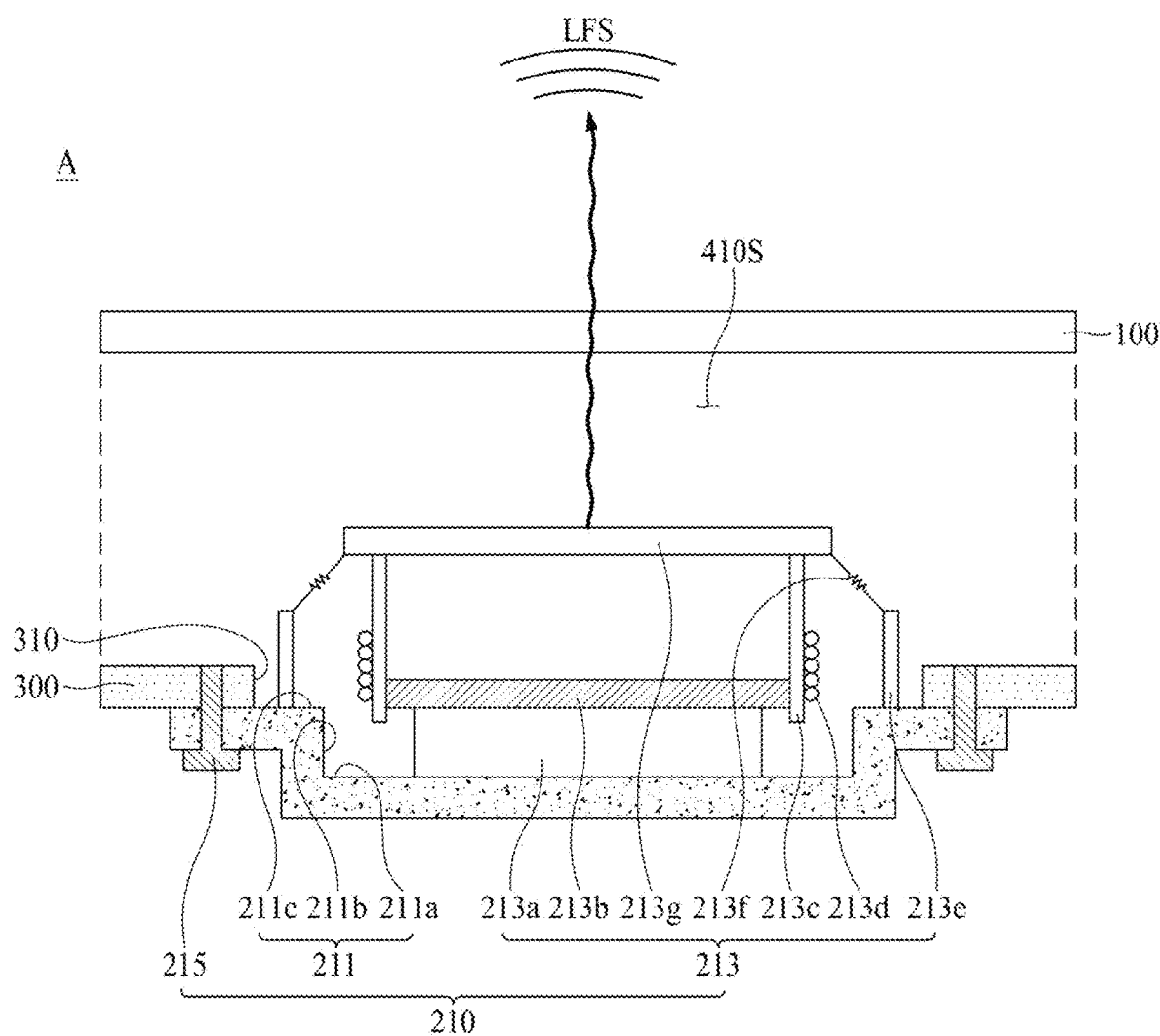
FIG. 5 is a cross-sectional view illustrating a region A of FIG. 4.

FIG. 5 is a cross-sectional view illustrating a region A of FIG. 4.

Referring to FIG. 5, the first sound generating module 210 may be spaced apart from the rear surface of the display panel 100 and may be fixed to the rear cover 300. According to an embodiment, the first sound generating module 210 may generate a sound LFS having the low sound band. For example, the first sound generating module 210 may transfer a vibration having the low frequency domain to the middle region of the display panel 100, and the display panel 100 may receive a vibration having the low frequency domain of the first sound generating module 210 to output the sound LFS having the low sound band to the forward region FD. Here, the first sound generating module 210 may correspond to a woofer, but is not limited to the term.

The first sound generating module 210 may vibrate the display panel 100 with a sound generating current applied thereto, based on Fleming's left hand rule. According to an embodiment, the first sound generating module 210 may include a module frame 211, a vibration unit 213, and a coupling member 215.

The module frame 211 may be fixed to the rear cover 300 to overlap the through hole 310 provided in the rear cover 300 and may support the first sound generating module 210. The module frame 211 may accommodate at least one vibration unit 213. For example, the vibration unit 213 may be an actuator or an exciter. Also, the module frame 211 may be fixed to the rear cover 300 to prevent a vibration from being transferred to a rearward region RD behind the first sound generating module 210. That is, the module frame 211 minimizes vibration loss which occurs in the rearward region RD behind the first sound generating module 210, thereby efficiently transferring a vibration of the first sound generating module 210 to the display panel 100. Also, the module frame 211 may form a closed space between the module frame 211 and the display panel 100, thereby maintaining a sound pressure in the first sound generating module 210 and enhancing a vibration characteristic of the first sound generating module 210.

The module frame 211 may include a floor surface 211a, an inner surface 211b, and an outer upper end 211c. In detail, the floor surface 211a of the module frame 211 may support a lower end of a magnet member 213a, and the inner surface 211b of the module frame 211 may be spaced apart from a side surface of the magnet member 213a and may surround the side surface of the magnet member 213a. That is, the floor surface 211a and the inner surface 211b of the module frame 211 may provide a recessed space for accommodating the vibration unit 213. Also, an upper outer portion 211c of the module frame 211 may support an external frame 213e. According to an embodiment, the floor surface 211a and the inner surface 211b of the module frame 211 may control a magnetic flux generated by the magnet member 213a along with an upper plate 213b to increase a density of a magnetic flux flowing in the vibration unit 213. For example, the module frame 211 may be formed of at least one of silicon nitride, aluminum nitride, zirconium nitride, titanium nitride, hafnium nitride, tantalum nitride, silicon oxide, aluminum oxide, and titanium oxide, but is not limited thereto. Therefore, the floor surface 211a and of the module frame 211 and the upper plate 213b may be respectively disposed in a lower end and an upper end of the magnet member 213a, and the inner surface 211b of the module frame 211 may surround a side surface of the magnet member 213a and may be spaced apart from the side surface of the magnet member 213a, thereby increasing a magnetic flux density generated by the magnet member 213a and a coil 213d to enhancing a vibration characteristic.

The vibration unit 213 may be accommodated into the recessed space of the module frame 211 to vibrate the display panel 100. In detail, the vibration unit 213 may be disposed on the floor surface 211a of the module frame 211 and may vibrate the display panel 100 according to a vibration signal corresponding to a sound signal associated with an image by using the module frame 211 as a supporter.

The vibration unit 213 may include the magnet member 213a, the upper plate 213b, a bobbin 213c, the coil 213d, the external frame 213e, a damper 213f, and a vibration plate 213g.

The magnet member 213a may be disposed on the floor surface 211a of the module frame 211. In detail, the magnet member 213a may be disposed between the upper plate 213b and the floor surface 211a of the module frame 211 and may be surrounded by and spaced apart from the inner surface 211b of the module frame 211. According to an embodiment, the upper plate 213b may be disposed in one end of the magnet member 213a, the floor surface 211a of the module frame 211 may be disposed in the other end opposite to the one end of the magnet member 213a, and the inner surface 211b of the module frame 211 may be spaced apart from the side surface of the magnet member 213a and may surround the side surface of the magnet member 213a, whereby the module frame 211 and the upper plate 213b may control a magnetic flux generated by the magnet member 213a. Accordingly, the magnet member 213a may be surrounded by the module frame 211 and the upper plate 213b, and thus, the magnetic flux generated by the magnet member 213a may concentrate on the inside of the vibration unit 213 to prevent the magnetic flux from being leaked.

The upper plate 213b may be disposed on an upper end of the magnet member 213a and may be spaced apart from the vibration plate 213g. Also, the magnet member 213a and the upper plate 213b may be inserted into the bobbin 213c having a cylindrical shape, and thus, an outer circumference surface of each of the magnet member 213a and the upper plate 213b may be surrounded by the bobbin 213c. Therefore, the magnet member 213a and the upper plate 213b may guide a rectilinear reciprocating motion of the bobbin 213c. Here, the upper plate 213b may be referred to as a center pole or pole pieces. According to an embodiment, the upper plate 213b may be formed of a material having magnetism like iron (Fe), and thus, may increase a magnetic flux density generated by the magnet member 213a.

The bobbin 213c may surround the upper plate 213b and may be attached on a rear surface of the vibration plate 213g. In detail, the bobbin 213c may surround the magnet member 213a and the upper plate 213b and may be spaced apart from and surrounded by the external frame 213c. For example, when the sound generating current is applied to the coil 213d wound around an outer circumference surface of the bobbin 213c and thus a magnetic field is generated in the vibration unit 213, the bobbin 213c may vibrate the display panel 100 by using the vibration plate 213g, based on the magnetic field. Therefore, a front surface of the bobbin 213c may contact the vibration plate 213g, and the bobbin 213c may vibrate the display panel 100 by using the vibration plate 213g, based on whether a current is applied or not. Also, the display panel 100 may receive a vibration of the vibration plate 213g through the first air gap 410S to generate the sound LFS having the low frequency domain, and the sound LFS having the low frequency domain may be output to the forward region FD in front of the display panel 100. Here, the bobbin 213c may be formed of a material which transmits a magnetic flux and is low in thermal conductivity. For example, the bobbin 213c may be a cylindrical structure which is formed of a material produced by processing pulp or paper, aluminum (Al) or magnesium (Mg) or an alloy thereof, synthetic resin such as polypropylene, or polyamide-based fiber.

The coil 213d may be wound around the outer circumference surface of the bobbin 213c and may surround the magnet member 213a in a state of being spaced apart from the magnet member 213a. For example, the coil 213d may be wound around the outer circumference surface of the bobbin 213c and may surround the magnet member 213a in a state of being spaced apart from the magnet member 213a, whereby the coil 213a may be supplied with the sound generating current. Here, the coil 213d may be referred to as a voice coil. When the sound generating current is applied to the coil 213d, the bobbin 213c may be guided by the damper 213f and may vibrate according to Fleming's left hand rule based on an application magnetic field generated around the coil 213d and an external magnetic field generated around the magnet member 213a. For example, a magnetic flux generated based on a magnetic field may flow along a closed loop which is formed by sequentially connecting the coil 213d, the inner surface 211b of the module frame 211, the floor surface 211a of the module frame 211, the magnet member 213a, and the upper plate 213b. Therefore, the bobbin 213c may be guided by the damper 213f and may vibrate to transfer a vibration to the display panel 100.

The external frame 213e may be disposed on the upper outer portion 211c of the module frame 211. In detail, the external frame 213e may extend from the upper outer portion 211c of the module frame 211 to the display panel 100. Also, the external frame 213e may be disposed in parallel with the bobbin 213c and spaced apart from the bobbin 213c. An upper portion of the external frame 213e may be connected to the damper 213f and may support one end of the damper 213f. Therefore, while the other end of the damper 213f is connected to the vibration plate 213g and guides a vibration of the vibration plate 213g, the external frame 213e may be fixed to the upper outer portion 211c of the module frame 211 and may support the one end of the damper 213f.

The damper 213f may be disposed between the external frame 213e and the vibration plate 213g and may guide the vibration of the vibration plate 213g. For example, the one end of the damper 213f may be connected to an upper end of the external frame 213f, and the other end of the damper 213f may be connected to the vibration plate 213g. The damper 213f may be provided in a structure which is creased between the one end and the other end thereof, and may be contracted and relaxed based on the vibration of the vibration plate 213g to control the vibration of the vibration plate 213g. Therefore, the damper 213f may be connected between the external frame 213e and the vibration plate 213g and may limit a vibration distance of the vibration plate 213g by using a restoring force. For example, when the vibration plate 213g moves by a certain distance or more or vibrates by a certain distance or less, the vibration plate 213g may be restored to an original position with the restoring force of the damper 213f. Also, the damper 213f may be referred to as a spider, a suspension, or an edge.

The vibration plate 213g may be disposed in parallel with the display panel 100 and spaced apart from the rear surface of the display panel 100, and the vibration plate 213g may transfer a vibration of the bobbin 213c to the display panel 100 through the first air gap 410S. For example, the vibration plate 213g may vibrate the first air gap 410S surrounded by the first partition member 410. Also, a vibration having the low frequency domain generated by the vibration plate 213g may be transferred to the display panel 100 through the first air gap 410S. Since the vibration plate 213g is spaced apart from the rear surface of the display panel 100, the vibration plate 213g may block heat occurring in the bobbin 213c so as not to be transferred to the display panel 100.

Moreover, the vibration plate 213g may indirectly transfer the vibration having the low frequency domain to the display panel 100 through the first air gap 410S, thereby preventing shaking of the display panel 100. For example, since the vibration plate 213g transfers the vibration having the low frequency domain and the vibration having the low frequency domain is broader in vibration range than a vibration having the middle-high frequency domain, the vibration plate 213g may be attached on the rear surface of the display panel 100 to directly vibrate the display panel 100, and thus, a vibration (or shaking) of the display panel 100 may be recognized by a viewer who is watching an image. Also, when the vibration (or shaking) of the display panel 100 reaches a level recognizable by the viewer, an image displayed by the display panel 100 may also be shaken, causing a problem where the image is shaken. Accordingly, the vibration plate 213g may indirectly transfer the vibration having the low frequency domain to the display panel 100 through the first air gap 410S, thereby preventing shaking of the display panel 100 and enhancing the image quality of the display panel 100.

According to an embodiment, a region where the first sound generating module 210 overlaps the display panel 100 may be wider than a region where the second sound generating module 220 overlaps the display panel 100. In detail, the first sound generating module 210 may transfer a vibration having the low frequency domain to the display panel 100 so as to generate the sound LFS having the low sound band. Also, as a diameter of the vibration plate 213g of the first sound generating module 210 increases, a reproducible low sound band may be expanded. Also, since the vibration plate 213g of the first sound generating module 210 transfers a vibration to the display panel 100 through the first air gap 410S, the vibration plate 213g may have a diameter which is greater than that of a bobbin ring 223g of the second sound generating module 220 directly attached on the rear surface of the display panel 100. In this manner, a diameter of the vibration plate 213g of the first sound generating module 210 may be greater than that of the bobbin ring 223g of the second sound generating module 220, and the vibration plate 213g of the first sound generating module 210 may be spaced apart from the rear surface of the display panel 100, whereby the first sound generating module 210 may expand the reproducible low sound band and may easily control an output of the sound LFS having the low sound band.

The coupling member 215 may couple the module frame 211 to the rear cover 300. In detail, the coupling member 215 may be provided in plurality and may fix the module frame 211 to the rear surface of the rear cover 300. For example, the coupling member 215 may pass through the upper outer portion 211c of the module frame 211 and may be fixed to the rear surface of the rear cover 300. According to an embodiment, the upper outer portion 211c of the module frame 211 may include a coupling member through hole, and the rear cover 300 may include a coupling member mounting hole. Therefore, the coupling member through hole of the upper outer portion 211c of the module frame 211 and the coupling member mounting hole of the rear cover 300 may be aligned in order for the coupling member 215 to simultaneously pass through the coupling member through hole and the coupling member mounting hole, and the coupling member 215 may couple the coupling member through hole of the upper outer portion 211c of the module frame 211 to the coupling member mounting hole of the rear cover 300 to fix the first sound generating module 210 to the rear cover 300.

Figure 6:
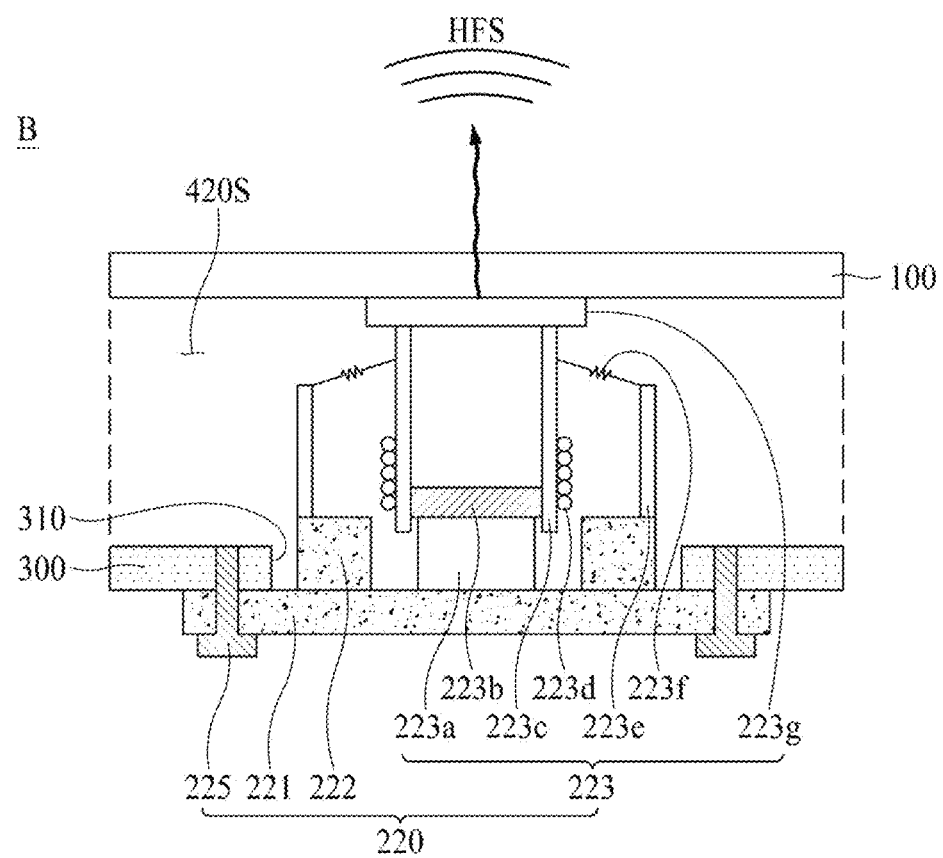
FIG. 6 is a cross-sectional view illustrating a region B of FIG. 4.

FIG. 6 is a cross-sectional view illustrating a region B of FIG. 4.

Referring to FIG. 6, the second sound generating module 220 may be attached on the rear surface of the display panel 100. According to an embodiment, the second sound generating module 220 may generate a sound HFS having the high sound band. For example, the second sound generating module 220 may transfer a vibration having the middle-high frequency domain to the peripheral region of the display panel 100, and the display panel 100 may receive the vibration having the middle-high frequency domain of the second sound generating module 220 to output the sound HFS having the high sound band to the forward region FD.

The second sound generating module 220 may vibrate the display panel 100 with the sound generating current applied thereto, based on Fleming's left hand rule. According to an embodiment, the second sound generating module 220 may include a module frame 221, a side frame 222, a vibration unit 223, and a coupling member 225.

The module frame 211 may be fixed to the rear cover 300 to overlap the through hole 310 provided in the rear cover 300 and may support the second sound generating module 220. The module frame 221 may accommodate at least one vibration unit 223. For example, the vibration unit 223 may be an actuator or an exciter. Also, the module frame 221 may be fixed to the rear cover 300 to prevent a vibration from being transferred to a region behind the second sound generating module 220. That is, the module frame 221 minimizes vibration loss which occurs in the region behind the second sound generating module 220, thereby efficiently transferring a vibration of the second sound generating module 220 to the display panel 100. Also, the module frame 221 may form a closed space between the module frame 221 and the display panel 100, thereby maintaining a sound pressure in the second sound generating module 220 and enhancing a vibration characteristic of the second sound generating module 220.

The module frame 221 may support a lower end of a magnet member 223a. The module frame 221 may control a magnetic flux generated by the magnet member 223a along with an upper plate 223b to increase a density of a magnetic flux flowing in the vibration unit 223. Therefore, the module frame 221 and the upper plate 223b of may be respectively disposed in a lower end and an upper end of the magnet member 223a and may increase a magnetic flux density generated by the magnet member 223a and a coil 223d to enhancing a vibration characteristic.

The side frame 222 may be disposed on the module frame 221 and may surround a lower portion of the vibration unit 223 in a state of being spaced apart therefrom. In detail, the side frame 222 may be formed of a conductive material and may control a magnetic flux generated by the magnet member 223a. For example, the side frame 222 may surround the magnet member 223a in a state of being spaced apart therefrom, and thus, may allow the magnetic flux generated by the magnet member 223a to concentrate on the inside of the vibration unit 223, thereby preventing the magnetic flux from being leaked. Therefore, the upper plate 223b may be disposed on the magnet member 223a, the module frame 222 may be disposed under the magnet member 223a, and the side frame 222 may surround a side surface of the magnet member 223a in a state of being spaced apart therefrom, thereby preventing leakage of the magnetic flux generated by the magnet member 223a to increase a magnetic flux density and enhancing a vibration characteristic. The side frame 222 is not limited to the term, and may be referred to as a yoke.

The vibration unit 223 may be disposed on the module frame 221 to vibrate the display panel 100. In detail, the vibration unit 223 may vibrate the display panel 100 according to a vibration signal corresponding to a sound signal associated with an image by using the module frame 221 as a supporter.

The vibration unit 223 may include the magnet member 223a, the upper plate 223b, a bobbin 223c, a coil 223d, an external frame 223e, a damper 223f, and a bobbin ring 223g.

The magnet member 223a may be disposed on the module frame 221. In detail, the magnet member 223a may be disposed between the upper plate 223b and the module frame 221 and may be surrounded by and spaced apart from the side frame 222. According to an embodiment, the upper plate 223b may be disposed in one end of the magnet member 223a, and the module frame 221 may be disposed in the other end opposite to the one end of the magnet member 223a, whereby the module frame 221 and the upper plate 223b may control a magnetic flux generated by the magnet member 223a. Accordingly, the magnet member 223a may be disposed between the module frame 221 and the upper plate 223b, and thus, the magnetic flux generated by the magnet member 223a may concentrate on the inside of the vibration unit 223 to prevent the magnetic flux from being leaked.

The upper plate 223b may be disposed on an upper end of the magnet member 223a and may be spaced apart from the display panel 100. Also, the magnet member 223a and the upper plate 223b may be inserted into the bobbin 223c having a cylindrical shape, and thus, an outer circumference surface of each of the magnet member 223a and the upper plate 223b may be surrounded by the bobbin 223c. Therefore, the magnet member 223a and the upper plate 223b may guide a rectilinear reciprocating motion of the bobbin 223c. Here, the upper plate 223b may be referred to as a center pole or pole pieces. According to an embodiment, the upper plate 223b may be formed of a material having magnetism like iron (Fe), and thus, may increase a magnetic flux density generated by the magnet member 223a.

The bobbin 223c may surround the upper plate 223b and may be attached on a rear surface of the vibration plate 223g through the bobbin ring 223g. In detail, the bobbin 223c may surround the magnet member 223a and the upper plate 223b and may be spaced apart from and surrounded by the side frame 222. For example, when the sound generating current is applied to the coil 223d wound around an outer circumference surface of the bobbin 223c and thus a magnetic field is generated in the vibration unit 223, the bobbin 223c may vibrate the display panel 100 by using the bobbin ring 223g, based on the magnetic field. Therefore, a front surface of the bobbin 223c may contact the bobbin ring 223g, and the bobbin 223c may vibrate the display panel 100 by using the bobbin ring 223g, based on whether a current is applied or not. Also, the display panel 100 may receive a vibration of the bobbin 223c to generate the sound HFS having the middle-high frequency domain, and the sound HFS having the middle-high frequency domain may be output to the forward region FD in front of the display panel 100. Here, the bobbin 223c may be formed of a material which transmits a magnetic flux and is low in thermal conductivity. For example, the bobbin 223c may be a cylindrical structure which is formed of a material produced by processing pulp or paper, aluminum (Al) or magnesium (Mg) or an alloy thereof, synthetic resin such as polypropylene, or polyamide-based fiber.

The coil 223d may be wound around the outer circumference surface of the bobbin 223c and may surround the magnet member 223a in a state of being spaced apart from the magnet member 223a. For example, the coil 223d may be wound around the outer circumference surface of the bobbin 223c and may surround the magnet member 223a in a state of being spaced apart from the magnet member 223a, whereby the coil 223a may be supplied with the sound generating current. Here, the coil 223d may be referred to as a voice coil. When the sound generating current is applied to the coil 223d, the bobbin 223c may be guided by the damper 223f and may vibrate according to Fleming's left hand rule based on an application magnetic field generated around the coil 223d and an external magnetic field generated around the magnet member 223a. For example, a magnetic flux generated based on a magnetic field may flow along a closed loop which is formed by sequentially connecting the coil 223d, the module frame 221, the magnet member 223a, and the upper plate 223b. Therefore, the bobbin 223c may be guided by the damper 223f and may vibrate to transfer a vibration to the display panel 100.

The external frame 223e may be disposed on the side frame 222. In detail, the external frame 223e may extend from an upper outer portion of the side frame 222 to the display panel 100. Also, the external frame 223e may be disposed in parallel with the bobbin 223c and spaced apart from the bobbin 223c. An upper portion of the external frame 223e may be connected to the damper 223f and may support one end of the damper 223f. Therefore, while the other end of the damper 223f is connected to the bobbin 223c and guides a vibration of the bobbin 223c, the external frame 223e may be fixed to an upper end of the side frame 222 and may support the one end of the damper 223f.

The damper 223f may be disposed between the external frame 223e and the bobbin 223c and may guide the vibration of the bobbin 223c. For example, the one end of the damper 223f may be connected to an upper end of the external frame 223f, and the other end of the damper 223f may be connected to the bobbin 223c. The damper 223f may be provided in a structure which is creased between the one end and the other end thereof, and may be contracted and relaxed based on the vibration of the bobbin 223c to control the vibration of the bobbin 223c. Therefore, the damper 223f may be connected between the external frame 223e and the bobbin 223c and may limit a vibration distance of the bobbin 223c by using a restoring force. For example, when the bobbin 223c moves by a certain distance or more or vibrates by a certain distance or less, the bobbin 223c may be restored to an original position with the restoring force of the damper 223f. Also, the damper 223f may be referred to as a spider, a suspension, or an edge.

The bobbin ring 223g may be disposed between the bobbin 223c and the display panel 100 and may transfer a vibration of the bobbin 223c to the display panel 100. Also, the bobbin ring 223g may attach the bobbin 223c on the rear surface of the display panel 100. For example, the bobbin ring 223g may be implemented with a double-sided tape, but is not limited thereto. Also, the bobbin ring 223g may prevent heat occurring in the bobbin 23c from being transferred to the display panel 100 and may efficiently transfer the vibration of the bobbin 223c to the display panel 100.

The coupling member 225 may couple the module frame 221 to the rear cover 300. In detail, the coupling member 225 may be provided in plurality and may fix the module frame 221 to the rear surface of the rear cover 300. For example, the coupling member 225 may pass through the module frame 221 and may be fixed to the rear surface of the rear cover 300. According to an embodiment, the module frame 221 may include a coupling member through hole, and the rear cover 300 may include a coupling member mounting hole. Therefore, the coupling member through hole of the module frame 221 and the coupling member mounting hole of the rear cover 300 may be aligned in order for the coupling member 225 to simultaneously pass through the coupling member through hole and the coupling member mounting hole, and the coupling member 225 may couple the coupling member through hole of the module frame 221 to the coupling member mounting hole of the rear cover 300 to fix the second sound generating module 220 to the rear cover 300.

Figure 7:
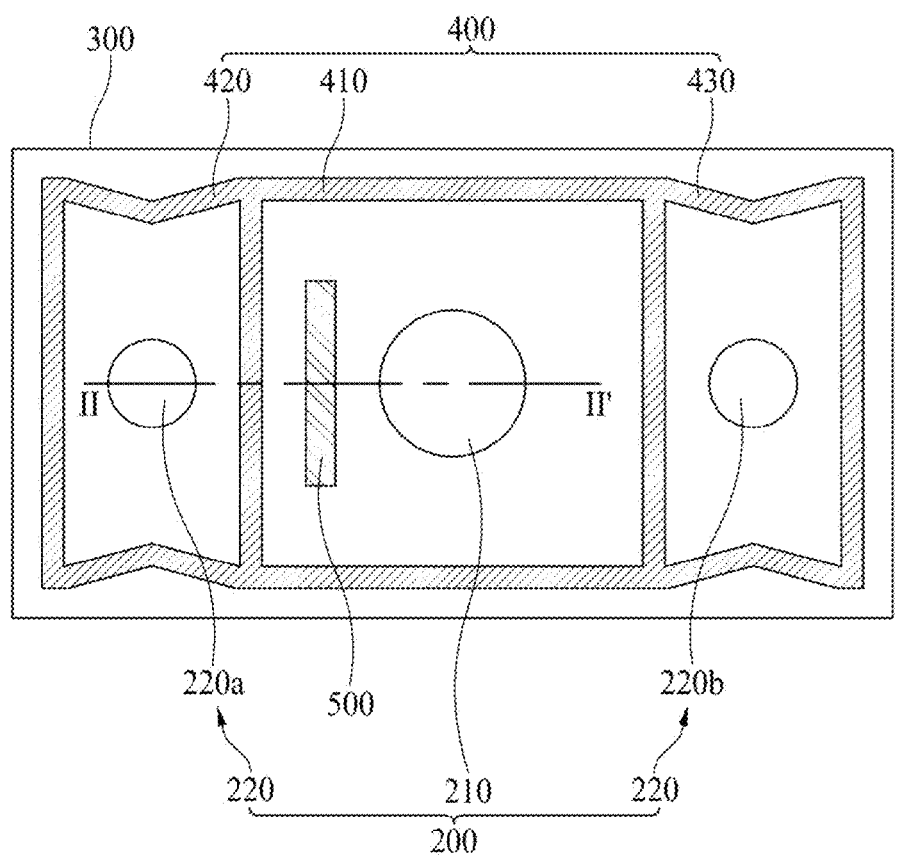
FIG. 7 is a rear view of a display apparatus according to a second embodiment of the present disclosure.
Figure 8:
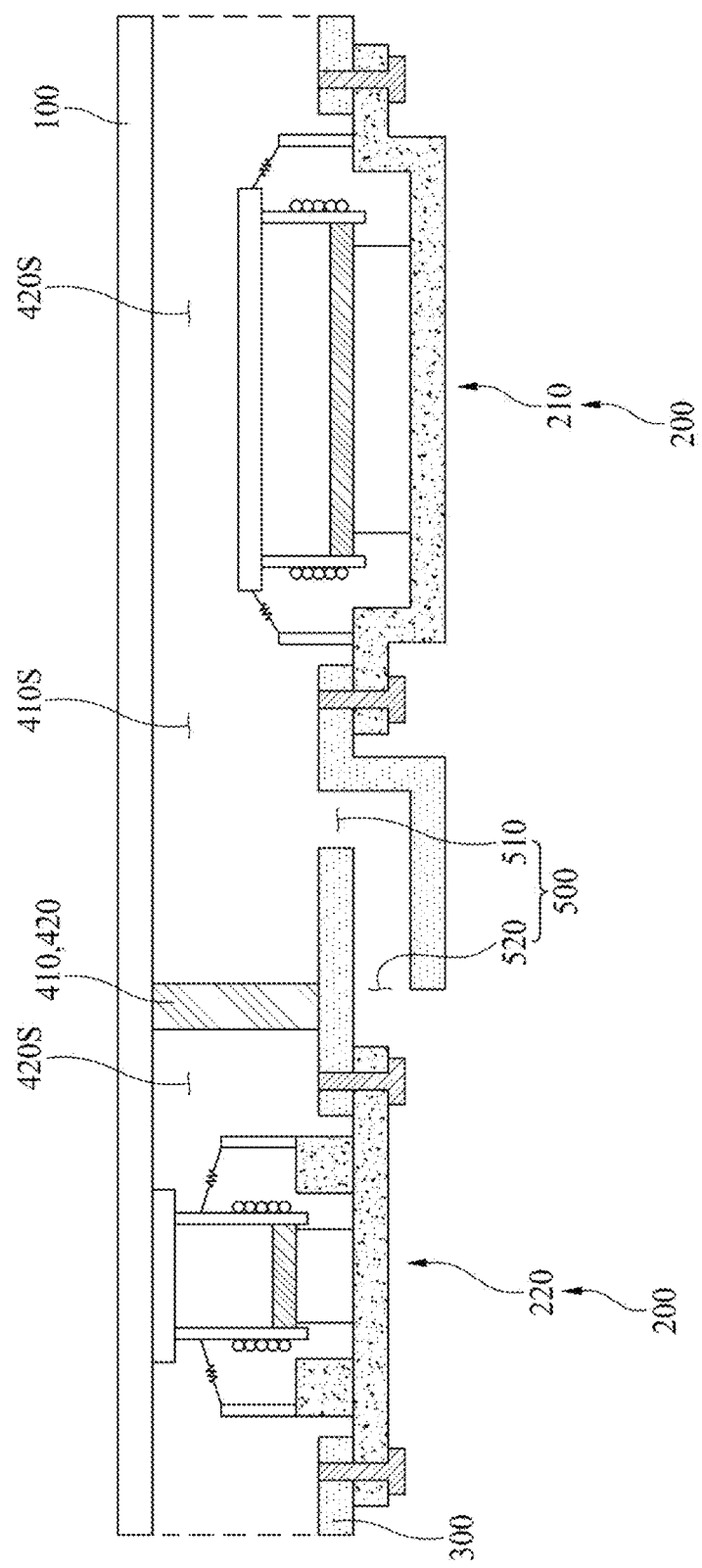
FIG. 8 is a cross-sectional view taken along line II-II' of FIG. 7.
Figure 9:
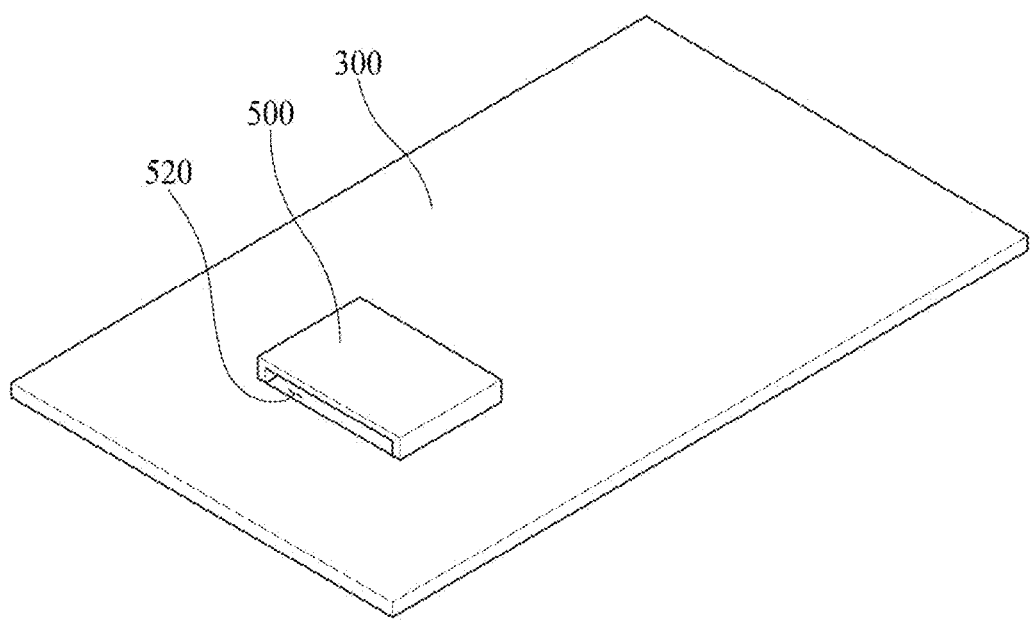
FIG. 9 is a diagram illustrating an amplification member in the display apparatus according to the second embodiment of the present disclosure.

FIG. 7 is a rear view of a display apparatus 10 according to a second embodiment of the present disclosure, FIG. 8 is a cross-sectional view taken along line II-II' of FIG. 7, and FIG. 9 is a diagram illustrating an amplification member in the display apparatus 10 according to the second embodiment of the present disclosure. Here, the display apparatus 10 according to the second embodiment of the present disclosure may further include an amplification member 500. Hereinafter, a configuration of the amplification member 500 will be mainly described, and descriptions of the same elements as the above-described elements will be briefly given or are omitted.

Referring to FIGS. 7 to 9, the display apparatus 10 may further include an amplification member 500 overlapping a first air gap 410S on a rear cover 300. The amplification member 500 may connect a rear space of the rear cover 300 to the first air gap 410S overlapping a first sound generating module 210. In detail, the amplification member 500 may include one end 510 connected to the first air gap 410S and another end 520 connected to the rear space of the rear cover 300. The amplification member 500 may amplify a vibration having the low frequency domain which is in the first air gap 410S and is input through the one end 510 of the amplification member 500, and may output the amplified vibration to the another end 520 of the amplification member 500. For example, when the first sound generating module 210 transfers the vibration having the low frequency domain to the first air gap 410S, the vibration having the low frequency domain in the first air gap 410S may vibrate a display panel 100 to output a sound LFS having the low sound band to a forward region FD in front of the display panel 100, or may output the sound LFS having the low sound band, amplified by the amplification member 500, to a rearward region RD behind the rear cover 300. Here, the sound LFS having the low sound band may have characteristic which is radially radiated, and thus, the sound LFS having the low sound band which is output through the amplification member 500 to the rearward region RD behind the rear cover 300 may also be transferred to a viewer located in the forward region FD in front of the display panel 100. Therefore, the amplification member 500 may amplify a vibration generated from the first sound generating module 210 to output the amplified vibration to the rearward region RD behind the rear cover 300, thereby enhancing a sound pressure level corresponding to the low frequency domain. As a result, in the display apparatus 10 according to the second embodiment of the present disclosure, since the amplification member 500 is provided, a reproducible low sound band is more expanded, and an output of a sound having the low sound band is more easily controlled than the first embodiment.

According to an embodiment, the amplification member 500 may include the one end 510 connected to the first air gap 410S and the another end 520 connected to the rear space of the rear cover 300, and a cross-sectional area of the another end 520 of the amplification member 500 may be wider than that of the one end 510. In detail, in a process where the vibration having the low frequency domain in the first air gap 410S passes through the one end 510 of the amplification member 500 and is output to the another end 520 of the amplification member 500, a sound pressure level may be amplified. In this case, as the cross-sectional area of the another end 520 of the amplification member 500 is provided wider than that of the one end 510, an amplification rate of a sound pressure level is enhanced. As described above, the amplification member 500 may amplify the vibration generated from the first sound generating module 210 to output the amplified vibration to the rearward region RD behind the rear cover 300, thereby enhancing a sound pressure level corresponding to the low frequency domain.

Figure 10:
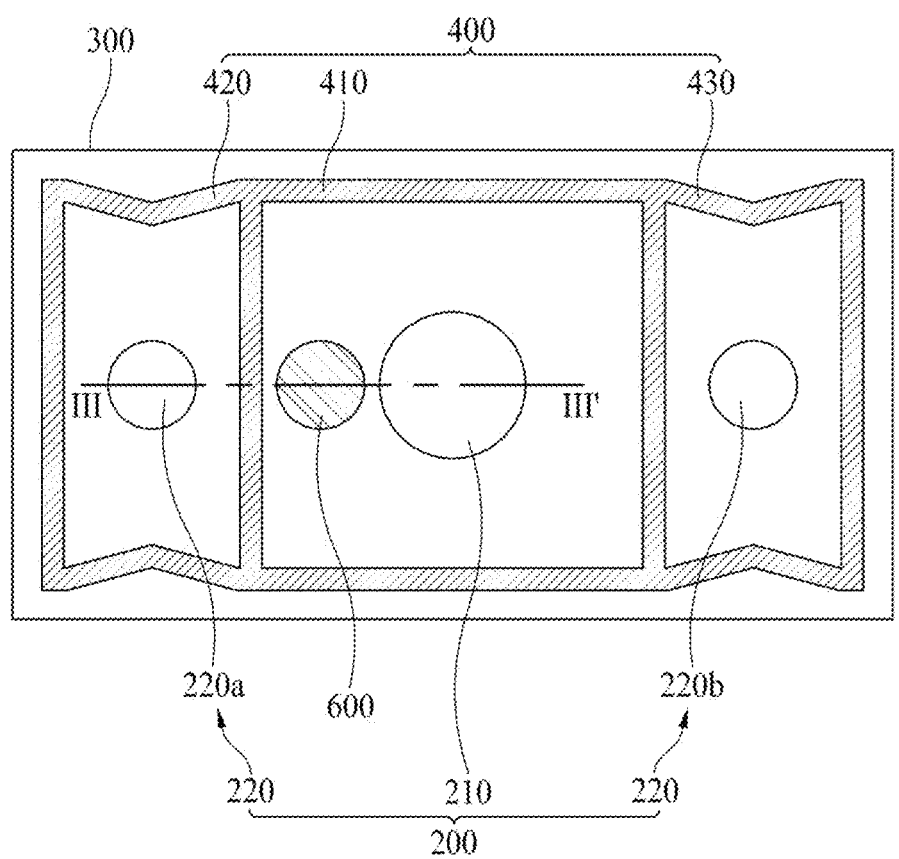
FIG. 10 is a rear view of a display apparatus according to a third embodiment of the present disclosure.

FIG. 10 is a rear view of a display apparatus 10 according to a third embodiment of the present disclosure, and FIG. 11 is a cross-sectional view taken along line of FIG. 10. Here, the display apparatus 10 according to the third embodiment of the present disclosure may further include a vibration transmission member 600. Hereinafter, a configuration of the vibration transmission member 600 will be mainly described, and descriptions of the same elements as the above-described elements will be briefly given or are omitted.

Referring to FIGS. 10 and 11, the display apparatus 10 may further include a vibration transmission member 600 which is supported by a rear cover 300 and transfers a vibration of a first air gap 410S to a region behind the rear cover 300. According to an embodiment, the vibration transmission member 600 may include a supporting frame 601, a vibration control member 603, and a passive radiator 605.

The supporting frame 601 may be disposed along a periphery of a through hole 310 provided in the rear cover 300 and may be supported by the rear cover 300, and the supporting frame 601 may support the vibration transmission member 600. One end of the supporting frame 601 may be fixed to the rear cover 300, and the other end of the supporting frame 601 may be fixed to the vibration control member 603, thereby stably supporting the vibration control member 603.

The vibration control member 603 may be disposed between the supporting frame 601 and the passive radiator 605 and may guide a vibration of the passive radiator 605. For example, the one end of the vibration control member 603 may be connected to the supporting frame 601, and the other end of the vibration control member 603 may be connected to the passive radiator 605. The vibration control member 603 may be provided in a structure which is creased between the one end and the other end thereof, and may be contracted and relaxed based on the vibration of the passive radiator 605 to control the vibration of the passive radiator 605. Therefore, the vibration control member 603 may be connected between the supporting frame 601 and the passive radiator 605 and may limit a vibration distance of the passive radiator 605 by using a restoring force. For example, when the passive radiator 605 moves by a certain distance or more or vibrates by a certain distance or less, the passive radiator 605 may be restored to an original position with the restoring force of the vibration control member 603. Also, the vibration control member 603 may be referred to as a spider, a suspension, or an edge.

The passive radiator 605 may be vibrated by a first sound generating module 210, and the vibration may be guided by the vibration control member 603. In detail, the passive radiator 605 may be spaced apart from and disposed in parallel with a rear surface of a display panel 100, and the passive radiator 605 may transfer a vibration of a first air gap 410S to a region behind the rear cover 300. For example, when the first sound generating module 210 transfers a vibration having the low frequency domain to the first air gap 410S, the vibration having the low frequency domain in the first air gap 410S may vibrate the display panel 100 to output a sound LFS having the low sound band to a forward region FD in front of the display panel 100, or may output the sound LFS having the low sound band to a rearward region RD behind the rear cover 300 through the passive radiator 605. Here, the sound LFS having the low sound band may have characteristic which is radially radiated, and thus, the sound LFS having the low sound band which is output through the passive radiator 605 to the rearward region RD behind the rear cover 300 may also be transferred to a viewer located in the forward region FD in front of the display panel 100. Therefore, the passive radiator 605 may passively vibrate according to the vibration having the low frequency domain in the first air gap 410S, and thus, may output the sound LFS having the low sound band to the rearward region RD behind the rear cover 300, thereby enhancing a sound pressure level corresponding to the low frequency domain. As a result, in the display apparatus 10 according to the third embodiment of the present disclosure, since the vibration transmission member 600 is provided, a reproducible low sound band is more expanded, and an output of a sound having the low sound band is more easily controlled than the first embodiment.

According to an embodiment, a phase of a vibration W1 of a vibration plate 213g of the first sound generating module 210 may be an antiphase with respect to a phase of a vibration W2 of the passive radiator 605 of the vibration transmission member 600. For example, when the first sound generating module 210 transfers the vibration W1 having the low frequency domain to the first air gap 410S, the vibration W1 having the low frequency domain in the first air gap 410S may vibrate (W3) the display panel 100 to output the sound LFS having the low sound band to the forward region FD in front of the display panel 100, or may vibrate (W2) the passive radiator 605 to output the sound LFS having the low sound band to the rearward region RD behind the rear cover 300. At this time, at a time when the vibration W1 of the vibration plate 213g applies pressure to the first air gap 410S, the vibration W2 of the passive radiator 605 may apply pressure to the rearward region RD behind the rear cover 300 which is spatially separated from the first air gap 410S. Also, pressure in the first air gap 410S may be reduced by a level of pressure which is applied to the rearward region RD behind the rear cover 300 by using the vibration W2 of the passive radiator 605. Also, since pressure in the first air gap 410S is reduced by a level of pressure which is applied to the rearward region RD behind the rear cover 300 by using the vibration W2 of the passive radiator 605, the phase of the vibration W1 of the vibration plate 213g may be an antiphase with respect to the phase of the vibration W2 of the passive radiator 605.

Therefore, the display apparatus 10 according to the present disclosure may include the sound generating module 210 spaced apart from the rear surface of the display panel 100, thereby preventing the display panel 100 from being shaken and preventing heat from being transferred to the display panel 100. Also, since the display apparatus 10 includes the amplification member 500 or the vibration transmission member 600, a reproducible low sound band is expanded, and an output of a sound having the low sound band is easily controlled.

As described above, the display apparatus according to the embodiments of the present disclosure may generate a sound so that a middle sound (400 Hz or more) to a high sound (20 kHz or less) having strong directionality travel to the front surface of the display panel, and may generate a sound so that a low sound (400 Hz or less) having weak directionality travels to the front surface and the rear surface of the display panel. Accordingly, an output position of an image displayed by the display apparatus may match an output position of a sound output from the display apparatus, thereby enhancing an immersiveness of a viewer who is watching the image displayed by the display apparatus.

Moreover, since the display apparatus according to the embodiments of the present disclosure includes the vibration generating device for vibrating the display panel, a speaker is not separately provided, thereby enhancing a degree of freedom in element disposition and enhancing an aesthetic design appearance of a set device.

Moreover, since the display apparatus according to the embodiments of the present disclosure includes the sound generating module spaced apart from the rear surface of the display panel, shaking of the display panel is prevented, and heat is prevented from being transferred to the display panel.

Moreover, since the display apparatus according to the embodiments of the present disclosure includes the sound generating module for outputting a sound having the low frequency band and the amplification member for amplifying a vibration generated by the sound generating module, a reproducible low sound band is expanded, and an output of a sound having the low frequency band is easily controlled.

Moreover, since the display apparatus according to the embodiments of the present disclosure includes the sound generating module for outputting a sound having the low frequency band and the vibration transmission member for transferring a vibration generated by the sound generating module to a region behind the display apparatus, the reproducible low sound band is expanded, and an output of a sound having the low frequency band is easily controlled.

It will be apparent to those skilled in the art that various modifications and variations can be made in the display apparatus of the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus, comprising:
    a display panel configured to display an image;
    a rear cover spaced apart from a rear surface of the display panel;
    a vibration generating device between the display panel and the rear cover, the vibration generating device being configured to vibrate the display panel; and
    a partition member between the display panel and the rear cover, the partition member directly contacting the rear surface of the display panel and the rear cover,
    wherein the vibration generating device comprises:
        a first sound generating module disposed at a middle region of the rear cover, the first sound generating module being spaced apart from the rear surface of the display panel, and
        a second sound generating module disposed at any one of a left region and a right region of the rear cover, the second sound generating module directly contacting the rear surface of the display panel, and
    wherein the partition member separates the middle region from the left region and the right region.

2. The display apparatus of claim 1, wherein the first sound generating module comprises:
    a module frame on a rear surface of the rear cover; and
    a vibration unit on the module frame to vibrate behind the display panel.

3. The display apparatus of claim 1, wherein:
    the vibration unit comprises a vibration plate disposed in parallel with and spaced apart from the display panel;
    the second sound generating module comprises:
        a module frame on a rear surface of the rear cover; and
        a vibration unit on the module frame, the vibration unit being configured to vibrate behind the display panel; and
    the vibration unit comprises a bobbin ring on the rear surface of the display panel, the bobbin ring being configured to vibrate the display panel.

4. The display apparatus of claim 1, wherein the partition member surrounds an air gap provided between the sound generating module and the display panel.

5. The display apparatus of claim 1, further comprising an amplification member overlapping the air gap on the rear cover.

6. The display apparatus of claim 5, wherein the amplification member connects the air gap to a rear space of the rear cover.

7. The display apparatus of claim 5, wherein:
    the amplification member comprises:
        a first portion connected to the air gap; and
        a second portion connected to the rear space of the rear cover; and
    a cross-sectional area of the second portion of the amplification member is wider than a cross-sectional area of the first portion.

8. The display apparatus of claim 5, wherein the amplification member is configured to amplify a vibration generated from the sound generating module to output the amplified vibration to a region behind the rear cover.

9. A display apparatus, comprising:
    a display panel configured to display an image, the display panel comprising:
        a first region defined at a middle region of the display panel; and a second region defined at any one of a left region and a right region of the display panel;

a rear cover spaced apart from a rear surface of the display panel;

a first sound generating module in the first region, the first sound generating module being configured to vibrate the display panel, the first sound generating module being spaced apart from the rear surface of the display panel, the first sound generating module not directly contacting the rear surface of the display panel;

a second sound generating module in the second region, the second sound generating module being configured to vibrate the display panel, the second sound generating module directly contacting the rear surface of the display panel; and a partition member between the display panel and the rear cover, the partition member directly contacting the rear surface of the display panel and the rear cover, the partition member separating the middle region from the left region and the right region.

10. The display apparatus of claim 9, wherein:
the first sound generating module comprises:
   a module frame on a rear surface of the rear cover; and
   a vibration unit on the module frame; and
the vibration unit comprises a vibration plate disposed in parallel with and spaced apart from the display panel.

11. The display apparatus of claim 9, wherein the second sound generating module comprises:
a module frame on a rear surface of the rear cover; and
a vibration unit on the module frame, the vibration unit being configured to vibrate behind the display panel; and
the vibration unit comprises a bobbin ring on the rear surface of the display panel, the bobbin ring being configured to vibrate the display panel.

12. The display apparatus of claim 9, wherein:
the second region comprises a left region and a right region of the display panel; and
the second sound generating module comprises a plurality of second sound generating module in the left region and the right region.

13. The display apparatus of claim 12, wherein the plurality of second sound generating module is symmetrically disposed with respect to the first sound generating module.

14. The display apparatus of claim 9, wherein a sound band of the first sound generating module is different from a sound band of the second sound generating module.

15. The display apparatus of claim 9, wherein:
the first sound generating module is configured to generate a low sound band; and
the second sound generating module is configured to generate a middle-high sound band.

16. The display apparatus of claim 9, wherein the partition member surrounds an air gap provided between the first and sound generating modules and the display panel.

17. The display apparatus of claim 16, wherein the first and second sound generating modules are further configured to transfer a vibration to the display panel through the air gap.

18. The display apparatus of claim 9, wherein the partition member comprises:
a first partition member surrounding the first region of the display panel;
a second partition member surrounding the left region of the display panel; and
a third partition member surrounding the right region of the display panel.

19. The display apparatus of claim 18, further comprising:
a first air gap between the first sound generating module and the first region of the display panel;
a second air gap between the second sound generating module and the left region of the display panel; and
a third air gap between the second sound generating module and the right region of the display panel.

20. The display apparatus of claim 19, wherein:
the first partition member surrounds the first air gap;
the second partition member surrounds the second air gap; and
the third partition member surrounds the third air gap.

21. The display apparatus of claim 19, further comprising an amplification member overlapping the first air gap.

22. The display apparatus of claim 21, wherein the amplification member connects a rear space of the rear cover to the first air gap.

23. The display apparatus of claim 21, wherein the amplification member comprises:
a first portion connected to the first air gap; and
a second portion connected to a rear space of the rear cover.

24. The display apparatus of claim 21, wherein the amplification member is configured to amplify a vibration generated from the first sound generating module to output the amplified vibration to a region behind the rear cover.

25. The display apparatus of claim 18, further comprising a bent part in at least one of a side of one of the second partition member and the third partition member.

* * * * *